United States Patent Office 3,256,239
Patented June 14, 1966

3,256,239
COMPOSITIONS COMPRISING A POLYEPOXIDE AND AN ADDUCT OF A HYDROXYALKYL ALKYLENE POLYAMINE WITH AN ACRYLATE
Frank L. Williamson, South Plainfield, and Anthony R. Olivo, South Somerville, N.J., assignors to Union Carbide Corporation, a corporation of New York
No Drawing. Filed Oct. 14, 1960, Ser. No. 62,535
9 Claims. (Cl. 260—47)

This invention relates to curable polyepoxide compositions and cured products obtained therefrom. More specifically, this invention relates to curable polyepoxide compositions which contain an adduct of a hydroxyalkyl alkylene polyamine and an acrylate as the curing agent and which are particularly suitable as barrier coatings for thermoplastic containers, such as polyethylene "squeeze" bottles, preventing egress therefrom of packaged fluids and their vapors.

Polyethylene containers, which are otherwise desirable because of their flexibility over a wide range of temperatures, their relative light weight, and their chemical inertness toward aqueous and non-aqueous fluids, have not found wide use in the packaging of liquid cosmetics and liquid organic chemicals due to the permeability shown by polyethylene toward these liquids. The permeability of polyethylene to liquid cosmetics such as perfumes which contain essential oils and flavor components, illustrative of which are citrus oils, clove oils, orange oils, lemon oils, eugenol, isoeugenol and inonones, and also the permeability to organic liquids such as gasoline, toluene, ethyl alcohol, and ethyl acetate has seriously limited the use of polyethylene containers as packaging means for such liquids.

It has been found that when perfumes or organic liquids, as described, are packaged in polyethylene containers, the more volatile components of these liquids pass through the walls of the containers. Consequently, the packages undergo a loss of weight. In addition, the packaged liquids undergo a basic change in character due to the escape of their more volatile components. The escape of liquids from the tightly capped containers results in a greater pressure acting on the exterior of the containers than on the interior walls thereof as air cannot readily pass into the containers to replace the escaped liquids. This pressure differential often results in the distortion or collapsing of the walls of the containers.

The problem of "permeability" of polyethylene has been attacked by various methods, none of which has resulted in an adequate solution. For example, it has been proposed to coat polyethylene surfaces with a variety of resinous coating compositions. Illustrative of one such composition is a copolymer of vinyl chloride and vinylidene chloride marketed under the trade name "Saran," and has the following physical properties: specific gravity 1.65 to 1.72, tensile strength 20,000 to 40,000 lbs./square inch, impact strength 0.3 to 1.0 ft.-lbs./notch inch, index of refraction 1.61, and dielectric strength 350 volts/mil.

'Saran" and other compositions which have been formulated and used as barrier coatings on polyethylene surfaces in order to improve the impermeability characteristics of polyethylene have not been found satisfactory in that they do not have good "barrier" action and, in addition, their adhesion to polyethylene surfaces is poor.

Polyethylene does not contain highly "polar" groups which could set up a strong electrostatic bond between the atoms of the coating composition and the polyethylene surfaces. Adhesion of resinous coating compositions to polyethylene surfaces depends upon mechanical factors, that is, the presence of rough, porous areas on the polyethylene surfaces into which the coatings can penetrate to form teeth or anchors. With coating or "barrier" compositions presently formulated, not only has the mechanical adhesion been weak but the coatings have not possessed an adequate degree of flexibility which would allow use of such compositions as coatings on surfaces of polyethylene "squeeze" bottles and flexible films.

It is an object of this invention, therefore, to provide a composition which is particularly suitable for use as a barrier coating on polyethylene surfaces.

It is a further object of this invention to provide compositions which, when applied as coatings and cured to an infusible state, exhibit excellent adhesion toward polyethylene surfaces, possess and retain excellent flexibility characteristics and good adhesion qualities after prolonged contact with liquid organic chemicals and liquid cosmetics.

A further object of this invention is to provide polyethylene surfaces of improved impermeability.

The curable compositions of this invention comprise a polyepoxide having an epoxy equivalency of greater than one and an adduct or more specifically a reaction product of a hydroxyalkyl alkylene polyamine and an acrylate which has the general formula:

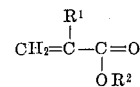

wherein: $R^2$ is an alkyl radical preferably containing from 1 to 18 carbon atoms inclusive; $R^1$ is either hydrogen or alkyl and when alkyl preferably containing a maximum of 2 carbon atoms; and the adduct itself contains an average of more than 2 amino-hydrogen atoms per molecule, preferably at least 3 amino-hydrogen atoms per molecule.

Illustrative of acrylates having the general formula previously given which can be reacted with hydroxyalkyl alkylene polyamines to produce the organic amine-acrylate adducts are the following: methylacrylate, ethylacrylate, n-propylacrylate, isopropylacrylate, n-butylacrylate, n-amylacrylate, n-hexylacrylate, 2-ethylhexylacrylate, n-octylacrylate, n-nonylacrylate, n-laurylacrylate, pentadecylacrylate, octadecylacrylate, methylmethacrylate, methylethacrylate, isopropylmethacrylate, n-hexylmethacrylate, n-nonylmethacrylate, ethylethacrylate, n-propylethacrylate, n-butylethacrylate, n-amylethacrylate, n-hexylethacrylate n-heptadecylacrylate, n-octadecylethacrylate, and the like. Specific hydroxyalkyl alkylene polyamines suitable for purposes of this invention are the hydroxyalkyl alkylene polyamines having the general formula:

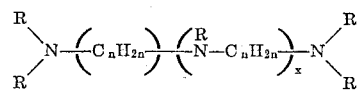

wherein $x$ is an integer from zero to 3 inclusive, $n$ is an integer from 2 to 6 inclusive, R in each instance is a monovalent substituent being either hydrogen or a hydroxyalkyl group wherein the alkyl group preferably contains from 1 to 4 carbon atoms inclusive as for example, hydroxyethyl and hydroxypropyl, the hydroxyalkyl groups in any molecule not necessarily being all the same hydroxyalkyl group, and the number of instances per molecule where R represents a hydroxyalkyl group being a whole number which is at least one, but less than $x+2$.

Typical hydroxyalkyl alkylene polyamines useful in the practice of the present invention, and within the scope of the above structural formula are the following:

N-hydroxyethyl ethylene diamine
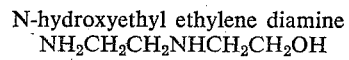

N-hydroxyethyl pentamethylene diamine
$NH_2(CH_2)_5NHCH_2CH_2OH$

N-hydroxypropyl tetramethylene diamine
$NH_2(CH_2)_4NHC_3H_6OH$

N-hydroxyethyl diethylene triamine
$NH_2C_2H_4NHC_2H_4NHC_2H_4OH$

N,N-dihydroxyethyl diethylene triamine
$NH_2C_2H_4NHC_2H_4N(C_2H_4OH)_2$

N,N''-dihydroxyethyl diethylene triamine
$NH(C_2H_4NHC_2H_4OH)_2$

N-hydroxypropyl diethylene triamine
$NH_2C_2H_4NHC_2H_4NHC_3H_6OH$

N,N-dihydroxypropyl diethylene triamine
$NH_2C_2H_4NHC_2H_4N(C_3H_6OH)_2$

N,N''-dihydroxypropyl diethylene triamine
$NH(C_2H_4NHC_3H_6OH)_2$

N-hydroxyethyl propylene diamine
$NH_2CH_2CH_2CH_2NHCH_2CH_2OH$

N-hydroxypropyl propylene diamine
$NH_2C_3H_6NHC_3H_6OH$

N-hydroxyethyl dipropylene triamine
$NH_2C_3H_6NHC_3H_6NHC_2H_4OH$

N,N'-dihydroxyethyl dipropylene triamine
$NH_2C_3H_6NHC_3H_6N(C_2H_4OH)_2$

N,N'-dihydroxyethyl dipropylene triamine

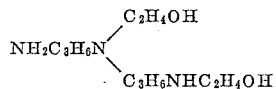

Tris-hydroxyethyl triethylene tetramine
$(HOC_2H_4)_2N(C_2H_4NH)_3C_2H_4OH$

Preparation of hydroxyalkyl alkylene polyamines is described in U.S. Patent 2,901,461 to V. Auerbach et al., issued August 25, 1959.

The compositions of this invention, comprising a curable mixture of a polyepoxide having an epoxy equivalency of greater than one and an adduct of a hydroxyalkyl alkylene polyamine and an acrylate, when coated onto and cured on polyethylene surfaces provide coatings which substantially prevent passage of organic liquids through the polyethylene without in any way affecting the otherwise desirable properties of polyethylene, such as flexibility, toughness, and inertness toward aqueous and non-aqueous fluids. In addition, the compositions of this invention, when applied as coatings and cured, not only exhibit excellent adhesive properties toward both "untreated" and "treated" polyethylene, i.e., polyethylene which has been subjected to chemical and/or electrical treatment in order to render it more receptive to coatings, but also possess a high degree of flexibility. These compositions, therefore, are particularly desirable as coatings for flexible polyethylene "squeeze" bottles and for flexible polyethylene films. Furthermore, cured products of the compositions of this invention retain both their excellent adhesion and flexibility characteristics over a wide range of temperatures and also on prolonged contact with the liquid which is packaged.

The preparation of the organic amine-acrylate adducts can be conveniently accomplished by heating, at elevated temperatures, a mixture containing the desired organic amine and acrylate. For example, when reacting a hydroxyalkyl alkylene polyamine containing at least 4 amino-hydrogen atoms, with an acrylate, it is customary to heat a mixture containing equimolar amounts of the reactants at a temperature of about 70° C. to about 150° C. to produce the organic amineacrylate adduct. This reaction can be represented by the equation which follows wherein, as can be seen, the amine preferentially adds across the olefinic double bond of the acrylate.

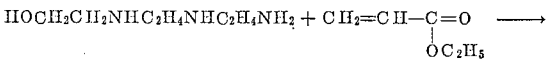

N-hydroxyethyldiethylene triamine    ethylacrylate

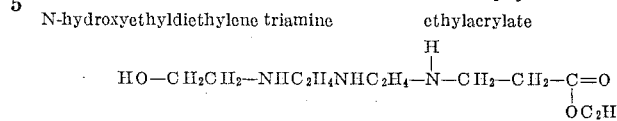

If desired, 2 or more moles of the organic amine per mole of the acrylate can be used, in which case the reaction proceeds as follows:

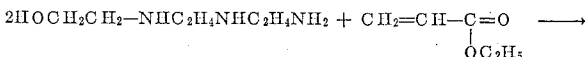

N-hydroxyethyldiethylene triamine    ethylacrylate

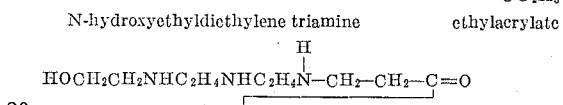

When using an organic amine containing only 3 amino-hydrogen atoms per molecule, it is then customary to react a mixture containing at least 2 moles of organic amine per mole of acrylate in order to obtain an adduct containing an average of more than 2 amino-hydrogen atoms per molecule. In that event the reaction will proceed in a manner described in the preceeding paragraph.

For purposes of this invention, the organic amine-acrylate adduct must contain an average of more than two-amino hydrogen atoms per molecule preferably at least 3 amino-hydrogen atoms per molecule in order to provide an adduct which will cure polyepoxides to a hard, tough infusible state. Generally the number of moles of acrylate per mole of amine used will have a value of at least 0.5 and a maximum value equal to or less than the number of amino hydrogen atoms of the amine minus two. It is obvious that mixtures of primary, secondary, and tertiary amines will be produced when the acrylates are reacted with the organic amines. Mainly, however, the reaction between the organic amine and acrylate is one wherein the primary amino group or groups of the amine, being more reactive, will preferentially react with the acrylate.

Preparation of organic amine-acrylate adducts is further described by S. M. McElvain and K. Rorig in J. Am. Chem. So., volume 70 (1948), pages 1822 and 1826.

The polyepoxides which can be cured with the amine-acrylate adducts are those organic compounds having an epoxy equivalency of greater than one, that is, compounds having an average of more than one epoxy group, i.e.

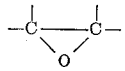

per molecule. These compounds, wherein the oxygen of the epoxy group is attached to vicinal carbon atoms, can be saturated or unsaturated, aliphatic, cycloaliphatic or heterocyclic, and can be substituted, with substituents such as halogen atoms, alkyl groups, ether groups and the like.

In further explanation of the term "epoxy equivalency" as used in this specification, it refers to the average number of epoxy groups contained in the average polyepoxide molecule. This value is obtained by dividing the molecular weight of the polyepoxide by its calculated epoxide equivalent weight. The epoxide equivalent weight is determined by heating a one gram sample of the polyepoxide with an excess of pyridinium chloride which is dissolved in pyridine. The excess pyridinium chloride is then back titrated with 0.1 N sodium hydroxide to an end point using phenolphthalein as the indicator. The epoxide equivalent weight is calculated by considering that one HCl molecule is equivalent to one epoxide group. If the polyepoxide is a single compound and all of its epoxy groups are intact, the epoxy equivalency values will be integers of whole numbers, such as 2, 3, 4 and the like. In those instances wherein the polyepoxide is a mixture of polyepoxides or contains some monomeric monoepoxides or where the polyepoxide has some of its epoxy groups hydrated or otherwise reacted, the epoxy equivalency values may contain fractions, such as 1.2, 1.5, 2.8, and the like.

Illustrative of polyepoxides which can be cured with the amine-acrylate adducts are the polyglycidyl ethers of polyhydric phenols, exemplified by the polyglycidyl ethers of such phenols as the mononuclear polyhydric phenols, resorcinol and pyrogallol, the di- or polynuclear phenols, such as the bisphenols described in Bender et al. U.S. 2,506,486 and polyphenylols, such as the novolak condensation products of a phenol and a saturated or unsaturated aldehyde, containing an average of from 3 to 20 or more phenylol groups per molecule (cf. "Phenoplasts" by T. S. Carswell, published 1947 by Interscience Publishers, New York). Exemplary of suitable polyphenylols derived from a phenol and an unsaturated aldehyde such as acrolein are the triphenylols, pentaphenylols, and heptaphenylols described in U.S. 2,885,385 to A. G. Farnham. The phenols may contain substituents such as alkyl, aryl or halogen ring substituents, as exemplified by the alkyl resorcinols, tribromoresorcinol, and the diphenols containing alkyl and halogen substituents on the aromatic ring (Bender et al., U.S. 2,506,486). The polyhydric polynuclear phenols can consist of two or more phenols connected by such groups as methylene, alkylene, or sulfone. The connecting groups are further exemplified by bis(p-hydroxyphenyl)methane, 2,2-bis-(p-hydroxyphenyl) propane and dihydroxydiphenyl sulfone.

Process for the preparation of polyglycidyl ethers of polyhydric phenols is described in detail in the Bender et al. patent (supra) and U.S. 2,801,989 to A. G. Farnham.

Particularly desirable for purposes of this invention are the polyglycidylethers of the bis(hydroxyphenyl)-alkanes as for example the diglycidylether of 2,2-bis-(p-hydroxyphenyl)-propane and the diglycidylether of bis-(p-hydroxphenyl)-methane. Other suitable polyglycidylethers of polyhydric phenols are enumerated in U.S. Patent 2,633,458 to E. C. Shokal.

Also suitable are the polyglycidylethers of polyhydric alcohols, such as the reaction products of epichlorohydrin and aliphatic compounds containing from two to four alcoholic hydroxyl groups, such as ethylene glycol, propane diols, butane diols, glycerine, hexane triols, and the like. (Methods of preparing polyglycidyl ethers of polyhydric alcohols are described in U.S. 2,898,349 to P. Zuppinger et al.)

Other suitable polyglycidyl compounds are the polyglycidyl esters of polycarboxylic acids, such as the polyglycidyl esters of adipic acid, phthalic acid, and the like. Polyglycidyl esters of polycarboxylic acids are described in detail in U.S. 2,870,170 to Payne et al. Also suitable are polyglycidyl compounds produced by reacting epichlorohydrin with aromatic amines, such as aniline, 2,6-dimethyl aniline, p-toluidine, m-chloroaniline, p-aminodiphenyl, m-phenylene diamine, p-phenylene diamine, 4,4'-diaminodiphenyl methane, or with amino phenols such as p-amino phenol, 5-amino-1-n-naphthol, 4-amino resorcinol, 2-methyl-4-amino phenol, 2-chloro-4-aminophenol, and the like. Specific compounds include, among others, N,N-diglycidyl aniline, N,N-diglycidyl-2,6-dimethyl aniline, N,N,N',N'-tetraglycidyl-4,4'-diamino diphenyl methane, the triglycidyl derivative of p-amino phenol wherein the amino-hydrogen and OH hydrogen atoms are replaced by glycidyl groups. Polyglycidyl derivatives of aromatic amines and amino phenols and methods for their preparation are further described in U.S. Patents 2,951,825 and 2,951,822 to N. H. Reinking et al. and N. H. Reinking. The so-called peracetic acid epoxides which are obtained by epoxidation across a double bond using peracetic acid, such as bis-(2,3-epoxycyclopentyl) ether and the like are also suitable.

It is to be understood that all patents and literature references referred to in this specification are incorporated herein by reference.

Various amounts of the organic amine-acrylate adducts can be used to cure the polyepoxides to hard, tough, infusible products. Generally, the organic amine-acrylate adducts are used in amounts such as to provide from about 0.2 to about 5 amino hydrogen atoms per epoxy group, preferably in amounts so as to provide from about 0.5 to about 1.5 amino-hydrogen atoms per epoxy group. For optimum results, however, the organic amine-acrylate adducts are used in stoichiometric amounts. For purposes of stoichiometric calculations, one epoxy group:

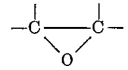

is deemed to react with one amino hydrogen atom. The actual amount of organic amine-acrylate adduct used will depend upon the desired end properties of the resultant cured polyepoxide composition. For example, increasing the amount of adduct used, tends to increase the flexibility of the cured composition.

The polyepoxide and the organic amine-acrylate adducts are combined by simply admixing the two together, generally at room temperature.

In those instances wherein the polyepoxide is a relatively low viscosity liquid, it is admixed directly with the adduct. Polyepoxides which are too viscous for ready mixing with the adducts can be heated to reduce their viscosity or liquid solvents can be added thereto in order to provide the desired fluidity. Normally solid polyepoxides are either melted or mixed with liquid solvents.

Suitable solvents for imparting the desired fluidity to highly viscous or normally solid polyepoxides are ketones, such as acetone, methyl isobutyl ketone, isophorone, and the like; esters, such as ethyl acetate, butyl acetate, ethylene glycol monoacetate, acetate of ethylene glycol monomethyl ether, and the like; ether alcohols, such as the methyl, ethyl, and butyl ether of ethylene glycol or of diethylene glycol; chlorinated hydrocarbons, such as trichloropropane, chloroform, and the like. Also suitable in admixture with the solvents noted are the aromatic hydrocarbons, such as benzene, toluene, xylene, and the like; alcohols, such as ethyl alcohol, isopropyl alcohol, n-butyl alcohol, and the like. The actual amount of solvent used will depend upon the polyepoxide being employed. If desired, rather than using solvents of the type described, or in addition thereto, reactive liquid diluents containing a single epoxy group:

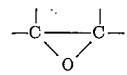

can be used in order to achieve the desired fluidity in the polyepoxide. Among such suitable reactive liquid diluents are butyl glycidyl ether, allyl glycidyl ether, phenyl glycidyl ether, and the like. In determining stoichiometric amounts with respect to the adducts, the presence of "reactive" diluents is taken into account.

Additional materials, such as fillers, pigments, fibers, dyes, plasticizers, peroxides such as benzoyl peroxide, accelerators such as triphenyl phosphite and the like can be added either to the polyepoxides or to the adducts, if desired.

In order to cure the polyepoxide compositions of this invention to hard, tough, infusible products, it is customary to heat the compositions at elevated temperatures, generally on the order of about 80° C to about 100° C. for a period of time ranging from about 1 to 3 hours. The actual heating cycle will depend upon the composition being cured. Room temperature curing, about 25°

C. can be effected but generally this takes a number of days.

The compositions of this invention, when they are to be used to formulate coating compositions, are prepared by admixing the desired polyepoxide and organicamine-acrylate adduct in a suitable solvent as, for example, 2-ethoxyethanol or a mixture of methylisobutyl ketone, toluene and butanol and then adjusting the solids content of the solution to the desired value. Generally, the solids content is from about 70 to about 90 percent by weight. It is to be understood, however, that the actual solids content will depend upon the type of application technique used to apply the coating solution. The compositions of this invention can be applied as coatings by such techniques as spraying, slushing, immersing, roller coating and by various other methods employed in the coating art.

Although the compositions of this invention have been described as particularly useful for use as coatings, they also have wide utility in the preparation of molded articles as for example electrical castings, and can be used to encapsulate electrical components.

The examples which follow are intended to further illustrate the present invention without limiting the scope thereof in any manner.

*Example I*

A. *Preparation of the organic amine-acrylate adduct.*—Into a triple-necked flask, equipped with a stirrer and thermometer, there was added 2000 grams of 2-ethylhexylacrylate and 1400 grams of N-hydroxyethyldiethylenetriamine. The resultant mixture was heated, with stirring, until the temperature of the contents of the flask reached 167° C. Heating was discontinued and the liquid, amine-acrylate adduct in the flask was cooled to room temperature, about 25° C. The liquid, amine-acrylate adduct was recovered and found to have a nitrogen assay, as determined by the Kjeldahl test, of 21.43 percent and an amino nitrogen equivalent of 160.5 grams per gram mole. Amino nitrogen equivalent was determined by titrating a sample of the adduct, in glacial acetic acid, with perchloric acid to a methyl violet endpoint and calculated using the equation:

$$\text{amino-nitrogen equivalent} = \frac{\text{weight of sample}}{(\text{ml. of acid})(\text{normality of acid})}$$

B. *Preparation of a curable composition of diglycidyl ether of 2,2-bis-(p-hydroxyphenyl)-propane and the adduct of 1–A.*—65 grams of the adduct of 1–A were thoroughly admixed at room temperature, about 25° C. with 100 grams of diglycidyl ether of 2,2-bis-(p-hydroxyphenyl)-propane having an epoxide equivalent weight of 192. The composition was cast into bars having the following dimensions: ¼ inch thick, inch wide, 8 inches long. The bars were allowed to stand at room temperature, about 25° C. for 2 hours, were thereafter heated for two hours at 150° C., and then subjected to various tests which are noted below, along with the results of the tests.

Tensile strength (ASTM–D–638–52T), p.s.i. _____ 2580
Tensile elongation (ASTM–D–638–52T) ____ 0.06×10⁶
Izod impact (ASTM–D–256–47T), ft. lbs./inch
  notch _____ 1.44
Rockwell hardness (M-scale) _____ —68

*Example II*

Five four-ounce Boston Round bottles, produced from polyethylene having a density of 0.96, having a wall thickness of about 40 mils and previously treated with a solution of potassium dichromate solution in sulfuric acid, commonly referred to as a "chromic acid" treatment (the "chromic acid" treatment is described in detail in United States patent to P. V. Horton, No. 2,668,134, issued February 2, 1954) were slush coated with a coating composition having the following formulation:

Formulation: Amount, grams
  Diglycidylether of 2,2 - bis - (p-hydroxyphenyl)-
    propane having an epoxide equivalent weight
    of 192 _____ 100
  Adduct of N - hydroxyethyldiethylenetriamine
    and 2-ethylhexylacrylate _____ 55
  Mixture of methyl isobutylketone, toluene, and
    butanol _____ 67

The "slush" coating of each bottle was accomplished as follows: Each bottle was filled with the coating composition described above. Each bottle was then inverted and allowed to drain until the drops of the coating solution fell at the rate of about one drop every ten seconds. Thereafter each bottle was placed on its side and the solvent vapors removed through a suction tube inserted about ¾ of the way inside the bottle. After about 20 minutes of drying in this fashion, the suction tube was removed and the bottles air dried for 1 hour at room temperature, about 25° C. and then heated for 1 hour at a temperature of 107° C. with the result that the coating compositions in each bottle cured to an infusible state. Coatings on each bottle were on the order of about 0.5 mil thick and each bottle weighed, on the average 4.255 grams.

Each bottle was then filled with 100 cc. gasoline and 15 cc. water. The bottles were capped and stored in an atmosphere which was at 70° F. and a relative humidity of 50 percent, for varying periods of time. The percent weight loss after the storage time indicated is noted below:

| Time: | Percent weight loss (average of 5 bottles) |
|---|---|
| 1 week | 0.038 |
| 2 weeks | 0.080 |
| 3 weeks | 0.122 |
| 4 weeks | 0.176 |
| 2 months | 0.371 |
| 3 months | 0.570 |

After 3 months the bottles were drained of their liquid contents and cut apart. There was no delamination of any coating.

The amine-acrylate used in this example was prepared as described in Example I with the exception that 49 parts by weight, N-hydroxyethyldiethylene triamine per 30 parts by weight 2-ethylhexyl acrylate were reacted.

Solvent used in this example was made up of methylisobutylketone, toluene and butanol in the following weight ratios 2 to 2 to 1 respectively.

*Example III*

Two coating compositions were prepared using the diglycidylether, the amine-acrylate adduct and the solvent described in Example II. Formulation of these coating compositions is noted below:

Formulation: Amount, grams
  A.
  Diglycidylether of 2,2-bis-(p-hydroxyphenyl)-
    propane _____ 50
  Amine-acrylate adduct _____ 27.5
  Mixture of methylisobutylketone, toluene and
    butanol _____ 19.5
  B.
  Diglycidylether of 2,2-bis-(p-hydroxyphenyl)-
    propane _____ 50
  Amine-acrylate adduct _____ 27.5
  Mixture of methylisobutyl ketone, toluene,
    butanol _____ 8.5

Five four-ounce Boston Round polyethylene bottles were coated with Formulation A and the coatings cured, both operations conducted in a manner described in Example II. Five other four-ounce Boston Round polyethylene bottles were coated with Formulation B and the coatings cured, both operations conducted in a manner described in Example II. The polyethylene bottles used in conducting this example, produced from polyethylene having a density of 0.96, had a wall thickness of about 40 mils and were "chromic acid" treated.

The average weight of bottles coated with Formulation A was 4.563 grams.

The average weight of bottles coated with Formulation B was 4.751 grams.

Each bottle was then filled with 100 cc. of gasoline and 15 cc. of water. The bottles were capped and stored in an atmosphere at 70° F. and a relative humidity of 50 percent, for varying periods of time. The percent weight loss after the storage time indicated is noted below. Bottles coated with Formulation A are identified as A; bottles coated with Formulation B are identified as B.

| Time: | Percent weight loss (average 5 bottles) |
|---|---|
| 1 week | 0.010–A, 0.014–B |
| 2 weeks | 0.020–A, 0.025–B |
| 3 weeks | 0.024–A, 0.043–B |
| 4 weeks | 0.033–A, 0.063–B |
| 2 months | 0.070–A, 0.150–B |
| 3 months | 0.109–A, 0.245–B |
| 4 months | 0.151–A, 0.340–B |

For purposes of comparison, 30 bottles of the same kind as that described in Example III and also "chromic acid" treated were coated with a composition of diglycidyl ether of 2,2-bis-(p-hydroxyphenyl)-propane having an epoxide equivalent weight of 192 and a stoichiometric amount of diethylene triamine. Each coating was applied and cured as described in Example III. Each coated bottle was filled with 100 cc. of gasoline and 15 cc. of water, capped and then stored in an atmosphere which was at 70° F. and a relative humidity of 50 percent. After 1 week the weight loss was 0.614 percent based on the average of the 30 coated bottles.

What is claimed is:

1. A curable composition consisting essentially of a polyepoxide having an epoxy equivalency of greater than one wherein the oxygen of each epoxy group is attached to vicinal carbon atoms and a reaction product of a hydroxyalkyl alkylene polyamine the general formula:

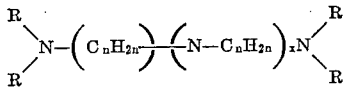

wherein $x$ has a value of 0 to 3 inclusive, $n$ has a value of 2 to 6 inclusive and each R is selected from the group consisting of hydrogen and hydroxyalkyl, the number of instances where R is a hydroxyalkyl group being at least one but less than $x+2$, and an acrylate having the general formula:

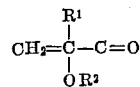

wherein $R^1$ is selected from the group consisting of hydrogen and an alkyl group and $R^2$ is an alkyl radical, said reaction product containing an average of more than two amino-hydrogen atoms per molecule, formed on reacting a mixture containing said amine and said acrylate wherein the number of moles of acrylate, per mole of amine, is about 0.5 to a maximum value of about the number of amino-hydrogen atoms of the amine minus two wherein said amine adds across the olefinic double bond of said acrylate and being present in said composition in an amount sufficient to cure said composition to an infusible product.

2. The cured product of the composition defined in claim 1.

3. A curable composition consisting essentially of a polyepoxide having an epoxy equivalency of greater than one wherein the oxygen of each epoxy group is attached to vicinal carbon atoms and a reaction product of a hydroxyalkyl alkylene polyamine having the general formula:

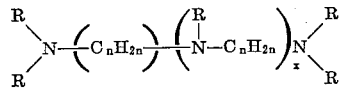

wherein $x$ has a value of 0 to 3 inclusive, $n$ has a value of 2 to 6 inclusive and each R is selected from the group consisting of hydrogen and hydroxyalkyl, the number of instances where R is a hydroxyalkyl group being at least one but less than $x+2$, and an acrylate having the general formula:

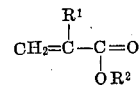

wherein $R^1$ is selected from the group consisting of hydrogen and an alkyl group and $R^2$ is an alkyl radical, said reaction product containing an average of more than two amino-hydrogen atoms per molecule, formed on reacting a mixture containing said amine and said acrylate wherein the number of moles of acrylate, per mole of amine, is about 0.5 to a maximum value of about the number of amino-hydrogen atoms of the amine minus two wherein said amine adds across the olefinic double bond of said acrylate and being present in said composition in amounts so as to provide from about 0.2 to about 5 amino-hydrogen atoms per epoxy group.

4. The cured product of the composition defined in claim 3.

5. A curable composition as defined in claim 3 wherein the polyepoxide is a polyglycidylether of a bis(hydroxyphenyl)alkane having an epoxy equivalency of greater than one.

6. A curable composition as defined in claim 5 wherein the polyglycidylether is diglycidylether of 2,2-bis(p-hydroxyphenyl)propane.

7. A curable composition as defined in claim 5 wherein the amine-acrylate reaction product is that of N,N-dihydroxyethyldiethylenetriamine and 2-ethylhexylacrylate.

8. A curable composition as defined in claim 5 wherein the amine-acrylate reaction product is that of N-hydroxyethyldiethylenetriamine and ethyl acrylate.

9. A thermoplastic article having a surface coated with the cured product of the composition defined in claim 1.

References Cited by the Examiner

UNITED STATES PATENTS

| 2,824,851 | 2/1958 | Hall | 260—47 |
| 2,864,775 | 12/1958 | Newey | 270—47 |
| 2,870,117 | 1/1959 | Vogel et al. | 117—132 |
| 2,883,308 | 4/1959 | Yamada et al. | 117—132 |
| 2,901,461 | 8/1959 | Auerbach et al. | 260—47 |

OTHER REFERENCES

Hackh's Chemical Dictionary, 3d Ed., 1944, McGraw-Hill Book Co., publ. (p. 310 relied on).

McElvain et al., J. Am. Chem. Soc., 70, pp. 1822 and 1826 particularly relied on.

Skeist, Epoxy Resins, p. 29 relied on, Reinhold Pub. Corp., N.Y., 1958.

WILLIAM H. SHORT, Primary Examiner.

MILTON STERMAN, JOSEPH R. LIBERMAN, LOUISE P. QUAST, Examiners.

T. D. KEWIN, S. N. RICE, Assistant Examiners.